United States Patent
Ha (10) Patent No.: US 11,919,146 B2
(45) Date of Patent: Mar. 5, 2024

(54) METHOD, SYSTEM, AND NON-TRANSITORY COMPUTER-READABLE RECORDING MEDIUM FOR CONTROLLING A SERVING ROBOT

(71) Applicant: Bear Robotics, Inc., Redwood City, CA (US)

(72) Inventor: John Jungwoo Ha, Seoul (KR)

(73) Assignee: Bear Robotics, Inc., Redwood City, CA (US)

( * ) Notice: Subject to any disclaimer, the term of this patent is extended or adjusted under 35 U.S.C. 154(b) by 310 days.

(21) Appl. No.: 17/242,893

(22) Filed: Apr. 28, 2021

(65) Prior Publication Data
US 2022/0347858 A1    Nov. 3, 2022

(51) Int. Cl.
| | | |
|---|---|---|
| B25J 13/00 | (2006.01) | |
| B25J 11/00 | (2006.01) | |
| B25J 13/08 | (2006.01) | |
| B25J 19/02 | (2006.01) | |
| G06Q 50/12 | (2012.01) | |

(52) U.S. Cl.
CPC ........... *B25J 11/008* (2013.01); *B25J 13/085* (2013.01); *B25J 19/023* (2013.01); *G06Q 50/12* (2013.01)

(58) Field of Classification Search
CPC ...... B25J 13/085; B25J 11/008; B25J 9/0003; B25J 9/0009; B25J 19/0075; B25J 5/007; B25J 19/007; B25J 19/02; B25J 11/00; B25J 19/061; B25J 17/0241; G06Q 50/12; G05D 1/024; G05D 2201/0207; B62D 61/10
See application file for complete search history.

(56) References Cited

U.S. PATENT DOCUMENTS

| | | | | |
|---|---|---|---|---|
| 7,228,203 | B2 * | 6/2007 | Koselka | G05D 1/0251 700/246 |
| 8,359,122 | B2 * | 1/2013 | Koselka | G08B 21/043 700/250 |
| 11,142,401 | B2 * | 10/2021 | Melanson | B60P 3/00 |
| 11,458,615 | B2 * | 10/2022 | Newman | B25J 9/1682 |

(Continued)

FOREIGN PATENT DOCUMENTS

| | | |
|---|---|---|
| CN | 111899131 A | 11/2020 |
| JP | 2001300876 A | 10/2001 |

(Continued)

OTHER PUBLICATIONS

Liu, Improvement of Navigation of Mobile Robotics Based on IoT System, 2021, IEEE, p. 69-72 (Year: 2021).*

(Continued)

*Primary Examiner* — McDieunel Marc
(74) *Attorney, Agent, or Firm* — Dinsmore & Shohl LLP; Yongsok Choi, Esq.

(57) ABSTRACT

A method for controlling a serving robot is provided. The method includes the steps of: acquiring at least one of weight information on a support coupled to the serving robot and image information on the support; recognizing at least one serving object placed on or removed from the support on the basis of at least one of the weight information and the image information; and determining at least one destination of the serving robot on the basis of a result of the recognition and order information of at least one customer in a serving place.

13 Claims, 4 Drawing Sheets

(56) References Cited

U.S. PATENT DOCUMENTS

| | | | |
|---|---|---|---|
| 11,472,459 B2 * | 10/2022 | Ha | B62B 3/108 |
| 11,554,479 B1 * | 1/2023 | Newman | B25J 13/006 |
| 11,634,280 B2 * | 4/2023 | Melanson | B65G 1/1371 |
| | | | 340/5.65 |
| 2007/0198129 A1 * | 8/2007 | Koselka | G05D 1/0251 |
| | | | 700/245 |
| 2020/0290208 A1 | 9/2020 | Ha | |
| 2022/0410392 A1 * | 12/2022 | Ha | B25J 9/1661 |
| 2023/0014212 A1 * | 1/2023 | Ha | B25J 11/008 |
| 2023/0030633 A1 * | 2/2023 | Ha | B25J 11/008 |
| 2023/0032760 A1 * | 2/2023 | Ha | G10L 15/22 |

FOREIGN PATENT DOCUMENTS

| | | |
|---|---|---|
| JP | 2019175188 A | 10/2019 |
| KR | 101083700 B1 | 11/2011 |
| KR | 20200087362 A | 7/2020 |
| KR | 20210015577 A | 2/2021 |

OTHER PUBLICATIONS

Kaneko et al., Attendant robot for elderly service using sensor network system, 2013, IEEE, p. 1-6 (Year: 2013).*

Bischoff et al., Hermes—a versatile personal robotic assistant, 2004, IEEE, p. 1759-1779 (Year: 2004).*

Haidar et al., Smart Device Waiter using AI image and Voice Recognition with an IPS Navigation System, 2021, IEEE, p. 16-21 (Year: 2021).*

* cited by examiner

METHOD, SYSTEM, AND NON-TRANSITORY COMPUTER-READABLE RECORDING MEDIUM FOR CONTROLLING A SERVING ROBOT

FIELD OF THE INVENTION

The present invention relates to a method, system, and non-transitory computer-readable recording medium for controlling a serving robot.

BACKGROUND

Serving means providing objects including drinks or food to customers in a place such as a restaurant. In recent years, serving robots and the like have been developed and used for serving in place of, or rendering assistance to, waiters or waitresses. Such a serving robot usually functions to take food orders or carry out serving according to the orders, and may perform autonomous navigation using table position information or the like. The serving robot may comprise a transport means (including sensors for avoiding obstacles), a display means for menu output or order input, and the like. Further, the serving robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a serving robot moving part including a main wheel and one or more auxiliary wheels is provided; a middle part fixed to the lower part and rotatably connected to the upper part; and a control part configured to control the operations of the pair of articulated robot arms, the tray holding part, and the serving robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

However, according to the techniques introduced so far as well as the above-described conventional technique, a serving robot can only determine to which customer a serving object received from an employee in a serving place is to be served, on the basis of information inputted by the employee (e.g., the number of a table in a restaurant where the customer is located).

In this connection, the inventor(s) present a technique for allowing a serving robot to autonomously determine to which customer and/or how a serving object received from an employee in a serving place is to be served, even without information inputted by the employee.

SUMMARY OF THE INVENTION

One object of the present invention is to solve all the above-described problems in the prior art.

Another object of the invention is to acquire at least one of weight information on a support coupled to a serving robot and image information on the support; recognize at least one serving object placed on or removed from the support on the basis of at least one of the weight information and the image information; and determine at least one destination of the serving robot on the basis of a result of the recognition and order information of at least one customer in a serving place.

Yet another object of the invention is to allow a serving robot to autonomously determine to which customer and/or how a serving object received from an employee in a serving place is to be served.

Still another object of the invention is to allow serving to be carried out even if an employee in a serving place does not input each destination to a serving robot one by one, thereby increasing the work efficiency of the employee and the serving robot.

The representative configurations of the invention to achieve the above objects are described below.

According to one aspect of the invention, there is provided a method for controlling a serving robot, the method comprising the steps of: acquiring at least one of weight information on a support coupled to the serving robot and image information on the support; recognizing at least one serving object placed on or removed from the support on the basis of at least one of the weight information and the image information; and determining at least one destination of the serving robot on the basis of a result of the recognition and order information of at least one customer in a serving place.

According to another aspect of the invention, there is provided a system for controlling a serving robot, the system comprising: an information acquisition unit configured to acquire at least one of weight information on a support coupled to the serving robot and image information on the support; and a destination management unit configured to recognize at least one serving object placed on or removed from the support on the basis of at least one of the weight information and the image information, and to determine at least one destination of the serving robot on the basis of a result of the recognition and order information of at least one customer in a serving place.

In addition, there are further provided other methods and systems to implement the invention, as well as non-transitory computer-readable recording media having stored thereon computer programs for executing the methods.

According to the invention, it is possible to acquire at least one of weight information on a support coupled to a serving robot and image information on the support; recognize at least one serving object placed on or removed from the support on the basis of at least one of the weight information and the image information; and determine at least one destination of the serving robot on the basis of a result of the recognition and order information of at least one customer in a serving place.

According to the invention, it is possible to allow a serving robot to autonomously determine to which customer and/or how a serving object received from an employee in a serving place is to be served.

According to the invention, it is possible to allow serving to be carried out even if an employee in a serving place does not input each destination to a serving robot one by one, thereby increasing the work efficiency of the employee and the serving robot.

DETAILED DESCRIPTION OF THE INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

Figure 1:
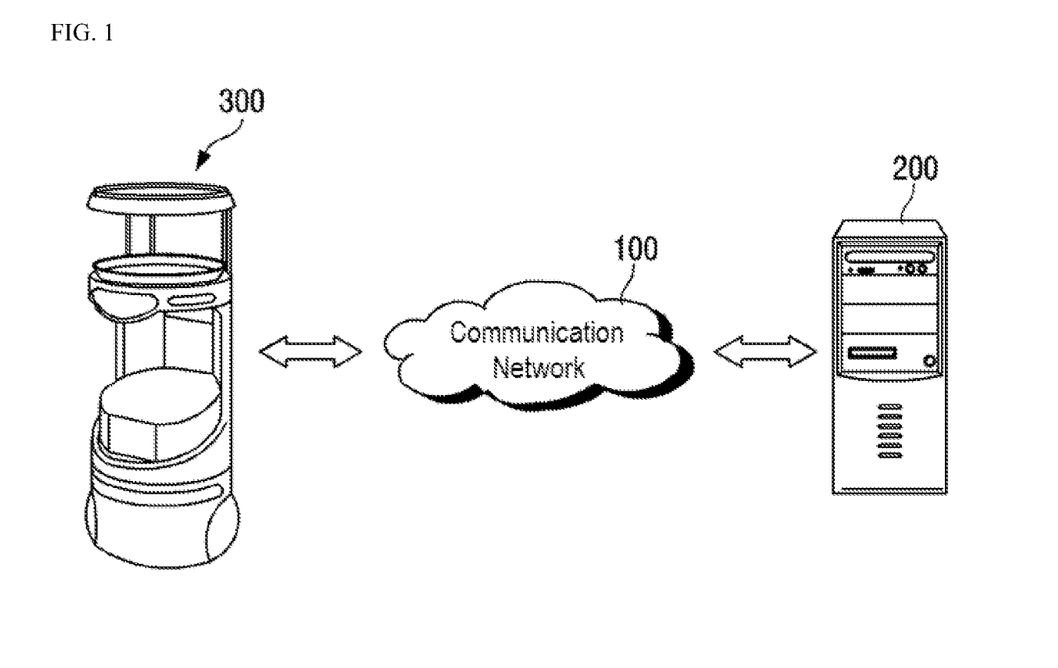
FIG. 1 schematically shows the configuration of an entire system for controlling a serving robot according to one embodiment of the invention.

FIG. 1 schematically shows the configuration of the entire system for controlling a serving robot according to one embodiment of the invention.

As shown in FIG. 1, the entire system according to one embodiment of the invention may comprise a communication network 100, a robot control system 200, and a serving robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may communicate with the serving robot 300 to be described below via the communication network 100, and may function to: acquire at least one of weight information on a support coupled to the serving robot 300 and image information on the support; recognize at least one serving object placed on or removed from the support on the basis of at least one of the weight information and the image information; and determine at least one destination of the serving robot 300 on the basis of a result of the recognition and order information of at least one customer in a serving place.

The configuration and functions of the robot control system 200 according to the invention will be discussed in more detail below.

Next, the serving robot 300 according to one embodiment of the invention is a device capable of communicating with the robot control system 200 via the communication network 100 and performing predetermined functions or assigned tasks (e.g., serving food, retrieving containers, etc.) autonomously without any operation of a user (e.g., a restaurant employee or a customer), and may include a support configured to support at least one serving object. The serving robot 300 according to one embodiment of the invention may include at least one of an imaging module (e.g., a visible light camera or an infrared camera) for acquiring images of surroundings, a scanner module (e.g., a LIDAR sensor) for acquiring information on obstacles, and a drive module (e.g., a motor) for moving the serving robot 300. Meanwhile, supporting of a serving object herein should be interpreted as encompassing supporting of a container for containing a serving object such as a drink or food, a means where the container may be placed (e.g., a tray), or the like.

Meanwhile, according to one embodiment of the invention, the serving robot 300 may include an application for controlling the serving robot 300. The application may be downloaded from the robot control system 200 or an external application distribution server (not shown). According to one embodiment of the invention, the characteristics of the application may be generally similar to those of an information acquisition unit 210, a destination management unit 220, a communication unit 230, and a control unit 240 of the robot control system 200 to be described below. Here, at least a part of the application may be replaced with a hardware device or a firmware device that may perform a substantially equal or equivalent function, as necessary.

Figure 3:
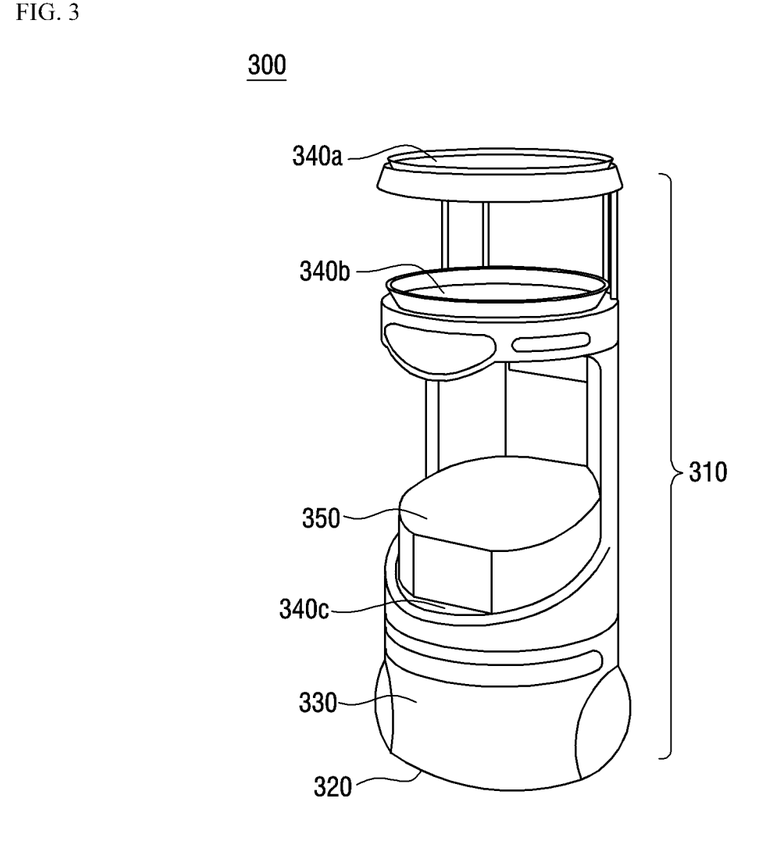
FIG. 3 illustratively shows the structure of a serving robot according to one embodiment of the invention.

FIG. 3 illustratively shows the structure of the serving robot 300 according to one embodiment of the invention.

Referring to FIG. 3, the serving robot 300 may comprise a main body 310, a drive unit 320, and a processor 330.

First, the main body 310 according to one embodiment of the invention may be coupled to supports 340a, 340b, and 340c configured to support at least one serving object. According to one embodiment of the invention, the supports 340a, 340b, and 340c may be removably coupled for cleaning, replacement, or the like. Further, each of the supports 340a, 340b, and 340c may include a weight sensor (not shown) for sensing a weight supported by each of the supports 340a, 340b, and 340c. According to one embodiment of the invention, the weight sensor may be implemented using one or more strain gauges (e.g., three strain gauges, four strain gauges, or the like). In addition, according to one embodiment of the invention, the weight sensor may be coupled to the processor 330.

Further, the main body 310 according to one embodiment of the invention may include a photographing module (not shown) configured to face a spatial region above each of the supports 340*a*, 340*b*, and 340*c*, in place of or in addition to the weight sensor. Meanwhile, according to one embodiment of the invention, the photographing modules configured to face the spatial regions above the respective supports 340*a*, 340*b*, and 340*c* are not necessarily included in the main body 310, but at least some of the photographing modules may be installed on a structure in a serving place.

Next, the drive unit 320 according to one embodiment of the invention may comprise a module for moving the main body 310 to other locations. For example, the drive unit 320 may include a module related to electrically, mechanically, or hydraulically driven wheels, propellers, or the like as the module for moving the main body 310 to other locations.

Further, the processor 330 may include the functions of at least one of the information acquisition unit 210 and the destination management unit 220 of the robot control system 200 according to the invention (e.g., the corresponding functions may be modularized and included), and may function to control the drive unit 320 through communication with an external system (not shown) that includes the functions of at least one of the information acquisition unit 210 and the destination management unit 220 of the robot control system 200.

Configuration of the Robot Control System

Hereinafter, the internal configuration of the robot control system 200 crucial for implementing the invention and the functions of the respective components thereof will be discussed.

Figure 2:
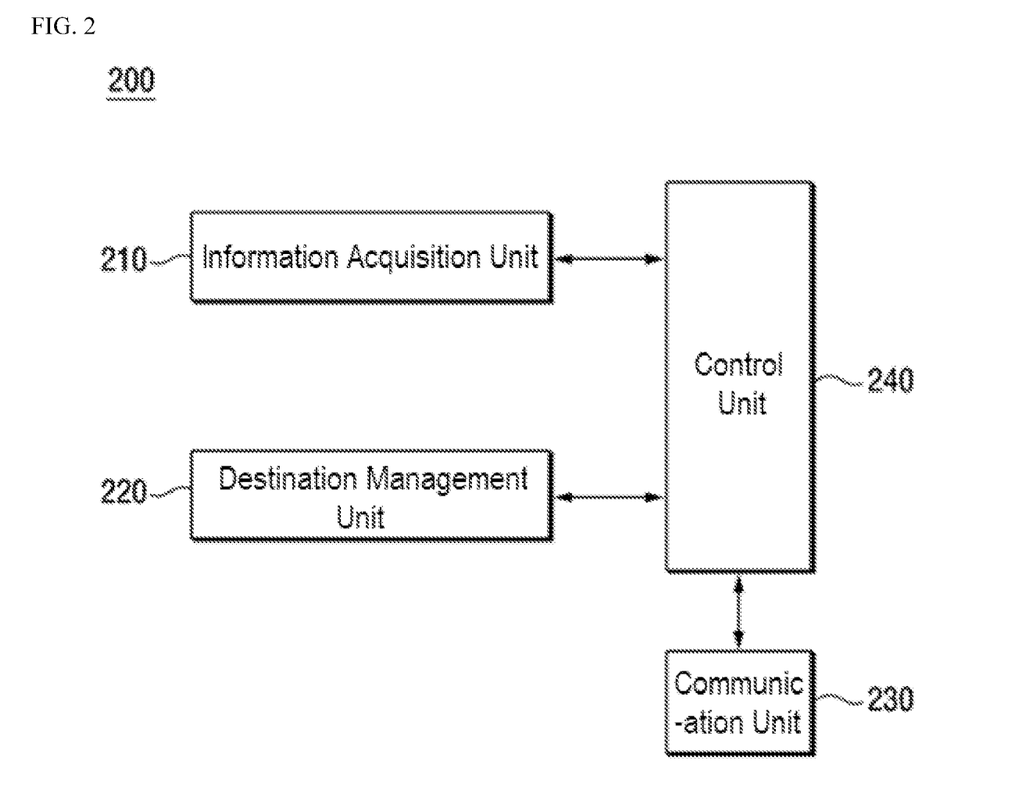
FIG. 2 specifically shows the internal configuration of a robot control system according to one embodiment of the invention.

FIG. 2 specifically shows the internal configuration of the robot control system 200 according to one embodiment of the invention.

As shown in FIG. 2, the robot control system 200 according to one embodiment of the invention may comprise an information acquisition unit 210, a destination management unit 220, a communication unit 230, and a control unit 240. According to one embodiment of the invention, at least some of the information acquisition unit 210, the destination management unit 220, the communication unit 230, and the control unit 240 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the serving robot 300 or an external system (not shown), as necessary. Further, in some cases, all of the functions and components of the robot control system 200 may be implemented or included in the serving robot 300.

First, the information acquisition unit 210 according to one embodiment of the invention may function to acquire at least one of weight information on a support coupled to the serving robot 300 and image information on the support.

Specifically, the information acquisition unit 210 according to one embodiment of the invention may acquire, from a weight sensor included in the support, a weight sensed by the weight sensor or a change in the weight as the weight information on the support. According to one embodiment of the invention, the weight information may be acquired for each of at least one support coupled to the serving robot 300.

Further, the information acquisition unit 210 according to one embodiment of the invention may acquire, from a photographing module configured to face a spatial region above the support, an image photographed by the photographing module or a change in the image as the image information on the support. According to one embodiment of the invention, the image information may be acquired for each of at least one support coupled to the serving robot 300.

Meanwhile, the information acquisition unit 210 according to one embodiment of the invention may function to acquire order information of at least one customer in a serving place. According to one embodiment of the invention, the order information may include a location of the at least one customer (e.g., the number of a table in a restaurant where the at least one customer is located), a menu ordered by the at least one customer (e.g., a type, size, number, and the like of the menu) and a time at which the menu is ordered, a number of the at least one customer, and the like. However, the order information of the at least one customer according to one embodiment of the invention is not limited to the foregoing, and may be diversely changed as long as the objects of the invention may be achieved.

For example, the information acquisition unit 210 according to one embodiment of the invention may acquire information inputted from a customer or an employee in the serving place via a microphone or a display (e.g., a touch screen) coupled to the serving robot 300 as the order information of the at least one customer.

As another example, the information acquisition unit 210 according to one embodiment of the invention may acquire information inputted to a point of sale (POS) system in the serving place as the order information of the at least one customer. According to one embodiment of the invention, the POS system may be an external system distinguished from the serving robot 300, and at least some of the functions thereof may be implemented or included in the serving robot 300.

However, the manner of acquiring the order information of the at least one customer according to one embodiment of the invention is not limited to the foregoing, and may be diversely changed as long as the objects of the invention may be achieved.

Next, the destination management unit 220 according to one embodiment of the invention may function to recognize at least one serving object placed on or removed from the support on the basis of at least one of the weight information on the support and the image information on the support.

Specifically, the destination management unit 220 according to one embodiment of the invention may determine whether a serving object is placed on or removed from the support on the basis of at least one of the weight information on the support and the image information on the support. Further, the destination management unit 220 according to one embodiment of the invention may specifically recognize what serving object is placed on or removed from the support on the basis of at least one of the weight information on the support and the image information on the support.

Here, according to one embodiment of the invention, it should be understood that placing or removing a serving object on or from the support encompasses not only directly placing or removing the serving object on or from the support, but also placing or removing the serving object on or from a structure disposed on the support. For example, referring to FIG. 3, a serving object may be considered to be placed on or removed from the support 340c when the serving object is placed on or removed from a structure 350 disposed on the support 340c. Likewise, referring to FIG. 4, food 420e and drinks 420d may be considered to be placed on or removed from supports 410d and 410e when the food 420e and drinks 420d are placed on or removed from structures 430 and 440 disposed on the supports 410d and 410e.

For example, the destination management unit 220 according to one embodiment of the invention may recognize a serving object placed on or removed from the support by processing the weight information on the support with reference to a database on weights of serving objects that may be provided in the serving place.

As another example, the destination management unit 220 according to one embodiment of the invention may recognize a serving object placed on or removed from the support by processing the image information on the support using a machine learning-based object recognition model for serving objects. Here, according to one embodiment of the invention, the object recognition model may be implemented using an algorithm such as R-CNN (Region-based Convolutional Neural Network), YOLO (You Only Look Once), and SSD (Single Shot Detector). However, the object recognition model is not necessarily limited to the foregoing and may be diversely changed as long as the objects of the invention may be achieved.

Meanwhile, the destination management unit 220 according to one embodiment of the invention may recognize a serving object placed on or removed from the support on the further basis of order information of at least one customer in the serving place, as well as at least one of the weight information on the support and the image information on the support.

For example, when a result of recognizing a serving object placed on or removed from the support on the basis of at least one of the weight information on the support and the image information on the support is A or B, the destination management unit 220 according to one embodiment of the invention may recognize the serving object placed on or removed from the support as A if there is no customer who has ordered a menu B among the at least one customer in the serving place.

Meanwhile, when the reliability of the result of recognizing the serving object placed on or removed from the support is not greater than a predetermined level, the destination management unit 220 according to one embodiment of the invention may request a user (e.g., an employee in the serving place) to input additional information for determining at least one destination of the serving robot 300.

Specifically, the destination management unit 220 according to one embodiment of the invention may calculate the reliability of the result of recognizing the serving object placed on or removed from the support (e.g., the probability that the serving object is A when the recognized menu is A). When the calculated reliability is not greater than a predetermined level, it may be difficult to determine an exact destination of the serving robot 300 on the basis of the result of the recognition. Thus, in this case, the destination management unit 220 according to one embodiment of the invention may control the serving robot 300 such that the serving robot 300 sends a notification message to an employee in the serving place, and may receive additional information for determining a destination of the serving robot 300 (e.g., the numbers of tables where customers are located, the order of visits of the tables, and the like) from the employee. According to one embodiment of the invention, the notification message may be indirectly presented via sound or light, or directly presented on a display, but the manner of presentation is not limited.

Meanwhile, when a serving object placed on or removed from the support is recognized, the destination management unit 220 according to one embodiment of the invention may function to determine at least one destination of the serving robot 300 on the basis of a result of the recognition and order information of at least one customer in the serving place. Further, in order to prevent other serving robots from visiting the above destination for the same purpose as the serving robot 300, the destination management unit 220 according to one embodiment of the invention may transmit information on the serving object placed on or removed from the support and information on the destination to the POS system or the like. Meanwhile, when at least one destination of the serving robot 300 is determined, the destination management unit 220 according to one embodiment of the invention may control the serving robot 300 such that the serving robot 300 moves to a first destination, which may be performed by determining whether a predetermined amount of time has elapsed with no change in the weight information on the support or the image information on the support, whether a command for movement has been received via speech or touch from an employee in the serving place, or the like.

Further, when a serving object placed on the support is recognized, the destination management unit 220 according to one embodiment of the invention may determine at least one destination of the serving robot 300 on the basis of a result of the recognition, order information of at least one customer in the serving place, and an amount of time that has elapsed from an order time of the at least one customer. For example, the destination management unit 220 according to one embodiment of the invention may determine the at least one destination such that serving may be sequentially carried out from the customer for whom the largest amount of time has elapsed from his/her order time, on the basis of the order time of the at least one customer included in the order information.

In addition, when a serving object placed on or removed from the support is recognized, the destination management unit 220 according to one embodiment of the invention may function to determine a criterion for leaving at least one destination of the serving robot 300 on the basis of a result of the recognition and order information of at least one customer in the serving place. Here, according to one embodiment of the invention, the criterion may include whether at least some of serving objects placed on the support have been removed from the support at the at least one destination, or whether a predetermined amount of time has elapsed in a state in which they have been removed.

Figure 4:
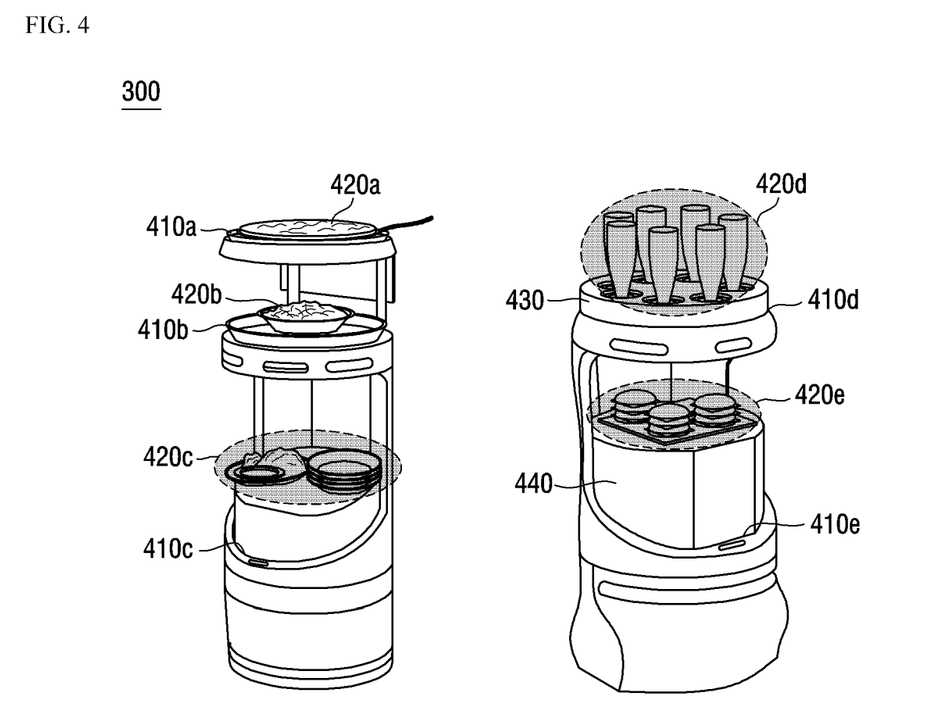
FIG. 4 illustratively shows how to determine a destination of a serving robot according to one embodiment of the invention.

FIG. 4 illustratively shows how to determine a destination of the serving robot 300 according to one embodiment of the invention.

For example, referring to FIG. 4, when food 420a, 420b, and 420c placed on supports 410a, 410b, and 410c coupled to the serving robot 300 are recognized, the destination management unit 220 according to one embodiment of the invention may determine, on the basis of a result of the recognition and order information of at least one customer in a serving place, a location of a customer (e.g., the number of a table where the customer is located) who has ordered the same menus (e.g., the types, sizes, and number of the menus are the same) as the food 420a, 420b, and 420c placed on the supports 410a, 410b, and 410c, among the at least one customer, as at least one destination of the serving robot 300.

Next, for example, it may be assumed that a first customer has ordered a menu A 420a and a second customer has ordered a menu B 420b and a menu C 420c, and that the order time of the first customer is earlier than the order time of the second customer. In this case, the destination management unit 220 according to one embodiment of the invention may determine a location of the first customer (e.g., the number of a table where the first customer is located) as a first destination of the serving robot 300, and a location of the second customer as a second destination of the serving robot 300, so that serving may be sequentially carried out from the customer for whom the largest amount of time has elapsed from his/her order time. Further, when the serving robot 300 finishes the serving (i.e., when all the food 420a, 420b, and 420c are removed from the supports 410a, 410b, and 410c), the destination management unit 220 according to one embodiment of the invention may control the serving robot 300 such that the serving robot 300 returns to a standby location (e.g., a kitchen).

Next, for example, the destination management unit 220 according to one embodiment of the invention may determine whether the menu 420a ordered by the first customer has been removed at the first destination (i.e., the location of the first customer), or whether a predetermined amount of time has elapsed in a state in which the menu has been removed, as a criterion for the serving robot 300 to leave the first destination. Further, the destination management unit 220 according to one embodiment of the invention may determine whether the menus 420b and 420c ordered by the second customer have been removed at the second destination (i.e., the location of the second customer), or whether a predetermined amount of time has elapsed in a state in which the menus have been removed, as a criterion for the serving robot 300 to leave the second destination.

As another example, referring to FIG. 4, it may be assumed that a first customer has ordered a menu A 420a, a menu B 420b, and a menu C 420c and a second customer has ordered the same menus (i.e., the menu A 420a, menu B 420b, and menu C 420c), and that the order time of the first customer is earlier than the order time of the second customer. In this case, the destination management unit 220 according to one embodiment of the invention may determine a location of the first customer (e.g., the number of a table where the first customer is located) as a destination of the serving robot 300, so that serving may be sequentially carried out from the customer for whom the largest amount of time has elapsed from his/her order time. Further, when the serving robot 300 finishes the serving (i.e., when all the food 420a, 420b, and 420c are removed from the supports 410a, 410b, and 410c), the destination management unit 220 according to one embodiment of the invention may control the serving robot 300 such that the serving robot 300 returns to a standby location (e.g., the kitchen).

As yet another example, referring to FIG. 4, when the drinks 420d and food 420e placed on the supports 410d and 410e are recognized, the destination management unit 220 according to one embodiment of the invention may determine, on the basis of a result of the recognition and order information of at least one customer in the serving place, a location of a customer (e.g., the number of a table where the customer is located) who has ordered the menus at least some of which are the same (e.g., the types, sizes, and number of the menus are the same) as the drinks 420d and food 420e placed on the supports 410d and 410e, among the at least one customer, as at least one destination of the serving robot 300.

Next, for example, it may be assumed that a first customer has ordered two menu As 420e and four menu Bs 420d and a second customer has ordered one menu A 420e and three menu Bs 420d, and that the order time of the first customer is earlier than the order time of the second customer. In this case, the destination management unit 220 according to one embodiment of the invention may determine a location of the first customer (e.g., the number of a table where the first customer is located) as a first destination of the serving robot 300, and a location of the second customer as a second destination of the serving robot 300, so that serving may be sequentially carried out from the customer for whom the largest amount of time has elapsed from his/her order time. Further, when the serving robot 300 finishes the serving (i.e., when all the drinks 420d and food 420e are removed from the supports 410d and 410e), the destination management unit 220 according to one embodiment of the invention may control the serving robot 300 such that the serving robot 300 returns to a standby location (e.g., the kitchen).

Next, for example, the destination management unit 220 according to one embodiment of the invention may determine whether the two menu As 420e and the four menu Bs 420d ordered by the first customer have been removed at the first destination (i.e., the location of the first customer), or whether a predetermined amount of time has elapsed in a state in which the menus have been removed, as a criterion for the serving robot 300 to leave the first destination. Further, the destination management unit 220 according to one embodiment of the invention may determine whether the menu A 420e and the three menu Bs 420d ordered by the second customer have been removed at the second destination (i.e., the location of the second customer), or whether a predetermined amount of time has elapsed in a state in which the menus have been removed, as a criterion for the serving robot 300 to leave the second destination.

Next, the communication unit 230 according to one embodiment of the invention may function to enable data transmission/reception from/to the information acquisition unit 210 and the destination management unit 220.

Lastly, the control unit 240 according to one embodiment of the invention may function to control data flow among the information acquisition unit 210, the destination management unit 220, and the communication unit 230. That is, the control unit 240 according to one embodiment of the invention may control data flow into/out of the robot control system 200 or data flow among the respective components of the robot control system 200, such that the information acquisition unit 210, the destination management unit 220, and the communication unit 230 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a serving robot, the method comprising the steps of:
   acquiring weight information on a support coupled to the serving robot;
   recognizing at least one serving object placed on or removed from the support on the basis of the weight information; and
   determining at least one destination of the serving robot on the basis of a result of the recognition and order information of at least one customer in a serving place,
   wherein in the recognizing step, what serving object is placed on or removed from the support is recognized by processing the weight information with reference to a database on weights of serving objects capable of being provided in the serving place.

2. The method of claim 1, wherein in the acquiring step, image information on the support is further acquired, and
   wherein in the recognizing step, the at least one serving object placed on or removed from the support is recognized on the further basis of at least one of the image information and the order information.

3. The method of claim 2, wherein in the recognizing step, the at least one serving object placed on or removed from the support is recognized by processing the image information using a machine learning-based object recognition model.

4. The method of claim 1, wherein the order information includes an order time of the at least one customer, and
   wherein in the determining step, the at least one destination is determined on the further basis of an amount of time that has elapsed from the order time.

5. The method of claim 1, wherein in the determining step, a criterion for the serving robot to leave the at least one destination is further determined on the basis of the result of the recognition and the order information.

6. The method of claim 1, wherein in the determining step, a user is requested to input additional information for determining the at least one destination of the serving robot, when reliability of the result of the recognition is not greater than a predetermined level.

7. A non-transitory computer-readable recording medium having stored thereon a computer program for executing the method of claim 1.

8. A system for controlling a serving robot, the system comprising:
   an information acquisition unit configured to acquire weight information on a support coupled to the serving robot; and
   a destination management unit configured to recognize at least one serving object placed on or removed from the support on the basis of the weight information, and to determine at least one destination of the serving robot on the basis of a result of the recognition and order information of at least one customer in a serving place,
   wherein the destination management unit is configured to recognize what serving object is placed on or removed from the support by processing the weight information with reference to a database on weights of serving objects capable of being provided in the serving place.

9. The system of claim 8, wherein the information acquisition unit is configured to further acquire image information on the support, and
   wherein the destination management unit is configured to recognize the at least one serving object placed on or removed from the support on the further basis of at least one of the image information and the order information.

10. The system of claim 9, wherein the destination management unit is configured to recognize the at least one serving object placed on or removed from the support by processing the image information using a machine learning-based object recognition model.

11. The system of claim 8, wherein the order information includes an order time of the at least one customer, and
    wherein the destination management unit is configured to determine the at least one destination on the further basis of an amount of time that has elapsed from the order time.

12. The system of claim 8, wherein the destination management unit is configured to further determine a criterion for the serving robot to leave the at least one destination on the basis of the result of the recognition and the order information.

13. The system of claim 8, wherein the destination management unit is configured to request a user to input additional information for determining the at least one destination of the serving robot, when reliability of the result of the recognition is not greater than a predetermined level.

* * * * *